2,954,365

PROCESS FOR THE PRODUCTION OF ISOCYANATE POLYMERIZATION PRODUCTS

Erwin Windemuth, Wilhelm Bunge, and Otto Bayer, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Filed Jan. 23, 1957, Ser. No. 635,594

Claims priority, application Germany Jan. 26, 1956

4 Claims. (Cl. 260—77.5)

This invention relates to a process for the production of isocyanate polymerization products. More particularly, the invention is concerned with a process for polymerizing organic isocyanates by heating the same in the presence of specific catalyst systems.

It has already been proposed to polymerize organic polyisocyanates, either as such or in admixture with monoisocyanates, by subjecting them to the action of strongly basic tertiary aliphatic amines. However, this method is applicable only to organic isocyanates containing at least one aromatically bonded isocyanato group and cannot be used to polymerize aliphatic and hydroaromatic isocyanates. Moreover, the above method requires in many cases an unreasonably long reaction time and comparatively high temperatures.

It is, therefore, an object of the present invention to provide a method for polymerizing organic isocyanates which can be applied not only to aromatic but also to aliphatic and hydroaromatic isocyanates. Another object of the invention is to provide a process for polymerizing organic isocyanates which can be carried out within a short time and under mild reaction conditions. A further object of the invention is to provide a process for polymerizing organic isocyanates which results in polymers that are free of unreacted monomeric isocyanates. Still further objects will appear hereinafter.

These objects are accomplished in accordance with the present invention by heating the monomeric organic isocyanate to be polymerized in the presence of a small amount of a tertiary amine and a carbamic acid ester monosubstituted on the nitrogen atom. In this manner, organic monoisocyanates and polyisocyanates can be converted into polymerization products of relatively high molecular weight which can find a great many commercial applications.

The presence of a catalyst system comprising a carbamic acid ester and a tertiary amine is characteristic of the polymerization process in accordance with the present invention. The use of tertiary amine-carbamic acid ester combinations makes it possible not only to polymerize aromatic isocyanates, but also aliphatic and hydroaromatic isocyanates, which do not undergo polymerization under the action of tertiary amines alone. Compounds with aromatically bonded isocyanato groups, which can be converted into polymerization products by the action of tertiary amines alone, can be transformed by the novel process into polymerization products of relatively high molecular weight in much shorter time and under milder conditions of reaction.

Any organic mono- and polyisocyanate may be polymerized in accordance with the invention, including phenyl isocyanate, tolyl isocyanate, p-nitrophenyl isocyanate, p-chlorophenyl isocyanate, α-naphthyl isocyanate, benzyl isocyanate, tetramethylene diisocyanate, hexamethylene diisocyanate, decamethylene diisocyanate, m-xylylene diisocyanate, p-xylylene diisocyanate, 4,6-dimethyl-1,3-xylylene diisocyanate, cyclohexane-1,4-diisocyanate, dicyclohexylmethane-4,4'-diisocyanate, m-phenylene diisocyanate, p-phenylene diisocyanate, 1-alkyl-benzene-2,4-diisocyanate, 1-alkyl-benzene-2,6-diisocyanate, 2,6-diethyl benzene-1,4-diisocyanate, diphenylmethane-4,4'-diisocyanate, diphenyl-dimethyl methane-4,4'-diisocyanate, 3,3'-dimethoxy-diphenyl-methane-4,4'-diisocyanate, naphthalene-1,5-diisocyanate, 1-methyl benzene-2,4,6-triisocyanate, triphenyl-methane-4,4'-4''-triisocyanate. As a general rule, it can be stated that the ease of polymerization of the isocyanates is in proportion to their reactivity with hydroxyl groups.

Any tertiary amine is useful as catalyst component in the process of the invention, representative examples including dimethyl aniline, hexahydrodimethyl aniline, alkyl morpholines, permethylated diethylene triamine or triethylene tetramine of the following formulae:

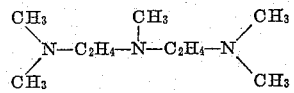

and

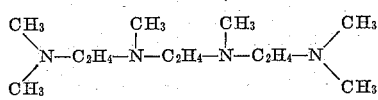

dialkyl piperazines, urethanes consisting of one mol of N,N-dialkyl aminoethanol and one mol of phenyl isocyanate or cyclohexyl isocyanate, diurethanes consisting of 1 mol of N-alkyl diethanolamine and 2 mols of phenyl isocyanate or cyclohexyl isocyanate, N,N-dialkylethanolamines and N-alkyl ethanolamines and trialkylamines.

Among these amines, the aliphatic amines are particularly effective and are for this reason preferred for use with isocyanates that are difficult to polymerize, for example, aliphatic or hydroaromatic isocyanates.

The carbamic acid esters to be concurrently employed are preferably obtained by reacting aliphatic, araliphatic, hydroaromatic or aromatic, monohydroxy or polyhydroxy compounds which can also contain hetero atoms, double bonds or triple bonds, with, for example, the aforementioned monoisocyanates or polyisocyanates. Whether a preformed and isolated carbamic acid ester is added to the isocyanate to be polymerized or whether this ester is formed in situ by adding a small amount of a monohydroxy or polyhydroxy compound to the isocyanate to be polymerized has no influence on the course of the polymerization.

Any hydroxy compound is suitable for the preparation of carbamic acid esters, including methyl alcohol, ethyl alcohol, propyl alcohol, butyl alcohol and higher aliphatic alcohols, cyclohexanol, benzyl alcohol and substituted products thereof, phenols, cresols and xylenols or substitution products thereof, N,N-dialkyl-amino-ethanols, glycols, such as ethylene glycol, 1,4-butylene glycol, diethylene glycol, butenediol, butinediol, N-methyl diethanolamine, triethanolamine, trimethylolpropane, glycerine and pentaerythritol.

In order to carry the polymerization processes into effect, it is merely necessary to add a tertiary amine and an hydroxy compound or a carbamic acid ester to the isocyanate to be polymerized and to heat the mixture. The tertiary amine catalyst is used in an amount of from about 0.0001 to about 2% by weight of tertiary nitrogen based on the weight of the NCO groups contained in the mixture. It is usually sufficient to use the tertiary amine in a quantity corresponding to less than 1% by weight of tertiary nitrogen, based on the weight of the NCO groups contained in the mixture. The amount of the carbamic acid ester concurrently used is also small. In most cases, the polymerization processes can be carried out in a reasonably short time with amounts of less than 0.3 mol of carbamic acid ester per isocyanate equivalent. When using carbamic acid methyl or benzyl esters, it is expedient to use considerably smaller amounts, since otherwise the polymerization proceeds too violently. In some cases the content of 0.001 mol of carbamic acid ester per isocyanate equivalent is still sufficient for the process of the invention.

The temperatures employed in the polymerization process according to this invention depend on the nature and the amount of the catalyst system, i.e., tertiary amine and carbamic acid ester, and on the reactivity of the isocyanate to be polymerized. In general, temperatures within the range of 80° to 220° C. have been found particularly advantageous. The reaction can be carried out in the absence of oxygen and in an inert gas atmosphere.

The process of the invention can also be carried out in solution and, if desired, at elevated pressure. All solvents which do not contain hydrogen atoms capable of reacting with isocyanates are suitable, such as, for example, methylene chloride, ethyl acetate, butyl acetate, monomethyl glycol ether acetate, chlorobenzene or o-dichlorobenzene. However, the polymerization velocity is slowed down by the use of solvents, other conditions being the same.

The polymerization of organic isocyanates in accordance with the instant invention results in polymers which are still soluble in organic solvents or which are insoluble therein, depending upon the degree of polymerization. Soluble polymers are always obtained if monoisocyanates are polymerized. Here there takes place a combination of 3 monomeric molecules with formation of isocyanuric acid derivatives. Thus, triphenyl isocyanurate, which can also be produced by other methods, is obtained in a quantitative yield from phenyl isocyanate, while tri-p-nitrophenyl isocyanurate is formed in a similar yield from p-nitrophenyl isocyanate. When using polyisocyanates, soluble products are obtained only when the polymerization is interrupted at the right moment. In this way, polyisocyanates of relatively high molecular weight are formed which contain 3 isocyanato groups in their molecule. If the polymerization progresses to a further extent, the polymers obtained have more than three isocyanato groups in their molecule. The formation of soluble isocyanates of relatively high molecular weight which contain one or even two isocyanato groups in the molecule is possible by copolymerizing a monoisocyanate with a polyisocyanate and discontinuing the copolymerization at the right time. The term "relatively high molecular weight" is intended to designate a molecular weight of from about 300 to about 2000. Thorough polymerization of polyisocyanates, if desired with concurrent use of monoisocyanates, leads to insoluble polymers having the properties of plastics.

The course of the polymerization can be followed in a simple manner by determining the isocyanate content of the reaction mixture titrimatically, using known analytical methods. This is essential in those cases where polymerization products of relatively high molecular weight having free isocyanato groups are desired. After reaching the desired degree of polymerization, the polymerization is stopped by adding compounds with an acid reaction, such as hydrohalic acids, sulfur dioxide, chlorides of inorganic acids, such as, for example, thionyl chloride and phosphorous oxy-chloride, carboxylic acids, carboxylic acid anhydrides, carboxylic acid halides, sulfonic acids or compounds which otherwise eliminate the effect of the tertiary amine, for example, by quaternization reactions.

The soluble polymers obtainable by the process of the invention can be used in place of monomeric isocyanates in the preparation of drugs, dyestuffs and textiles. They are particularly suitable for use in the production of plastics, where especially the high molecular products containing isocyanato groups can be employed as cross-linking agents. In view of the fact that the soluble polymers obtainable by the process of the invention have a very low volatility and a relatively high NCO content, they are most valuable non-toxic components for the formulation of polyurethane lacquers and coatings. Soluble polymers can also be used in the form of so-called masked isocyanates, in which the isocyanato groups are only liberated at elevated temperatures (Angew. Chem., A59, 265 (1947)). Finally, when using the present process, completely cross-linked insoluble products can be prepared by thorough polymerization, which products can be used directly as plastics for numerous applications, for example, for electrical insulation purposes.

The invention is further illustrated by the following examples without being restricted thereto.

Example 1

100 parts of phenyl isocyanate are mixed with 1 part of benzyl alcohol and with 0.43 part of permethylated diethylene triamine and heated to boiling point. A few minutes after boiling commences, the temperature rises above 200° C., and the mixture solidifies to form a crystalline mass. This no longer contains any monomeric fractions, which could easily be detected upon removal from the hot reaction vessel by the smell thereof. The reaction product is triphenyl isocyanurate with a melting point of 278° C. and the yield thereof is quantitative.

A corresponding mixture without addition of benzyl alcohol was also partially transformed into triphenyl isocyanurate after heating for 4 hours at boiling point, but still contained considerable amounts of free phenyl isocyanate.

In analogous manner, from o-, m- and p-tolyl isocyanate, p-ethoxy phenyl isocyanate, p-chlorophenyl isocyanate, the trimers were obtained with melting points of 161°, 209°, 265°, 253°, 330° C.

Example 2

20 parts of p-nitrophenyl isocyanate are dissolved in 40 parts of chlorobenzene, mixed with 0.2 part of methyl alcohol and with 0.2 part of permethylated diethylene triamine and heated to boiling point. A few minutes after boiling commences, a yellowish polymer which is insoluble in the conventional organic solvents, and has a melting point of 342–344° C. separates out. The yield is quantitative.

Example 3

100 parts of hexamethylene diisocyanate are heated with 3 parts of benzyl alcohol and with 0.43 part of permethylated diethylene triamine to 180° C. In the course of 20 minutes, the mixture has been transformed in a strongly exothermic reaction into a viscous, amber-yellow highly cross-linked plastic. A mixture without addition of benzyl alcohol has an isocyanate content of 44.9% as compared with 47.1% of the theoretical after heating for 16 hours at 200° C., and this shows that practically no polymerisation has taken place. By adding only 5 parts of benzyl alcohol without tertiary amine and heating the mixture for 16 hours at 200° C., the isocyanate content of such a mixture after this period is 39.4% as compared with 45.5% of the theoretical, which again shows that only a slight degree of polymerisation has occurred.

Example 4

500 parts of hexamethylene diisocyanate in 214 parts of chlorobenzene are mixed with 0.86 part of permethylated diethylene triamine and 10.5 parts of benzyl alcohol and heated to boiling point. In the course of 90 minutes, the isocyanate content has dropped from 33.8% to 19.3%, and simultaneously, with constant boiling of the reaction mixture, the temperature drops from 176° C. to 162° C. After reaching an isocyanate content of 19.3%, the polymerization is stopped by adding 1.7 parts of benzyl chloride. No further drop in the isocyanate value is to be observed. The polyisocyanate of relatively high molecular weight thereby formed is excellently suitable as a cross-linking agent for isocyanate adhesives.

If the above mixture without tertiary amine is heated for 16 hours at boiling point (176° C.) it is only possible after this period to measure a drop in the isocyanate value from 34.2% at the start to 32.7% at the end. Similarly, upon heating 500 parts of hexamethylene diisocyanate with 2.15 parts of permethylated diethylene triamine in 214 parts of chlorobenzene for 16 hours, it is only possible to observe a drop in the isocyanate value from 34.9% at the start to 33.2% at the end of the reaction period. Consequently, in both cases, the separate use of tertiary amine on the one hand and benzyl alcohol on the other hand does not cause any material polymerization of the hexamethylene diisocyanate.

*Example 5*

0.215 part of permethylated diethylene triamine and also 3.54 parts of phenyl carbamic acid methyl ester are added to 257 parts of a 70% solution of hexamethylene diisocyanate in chlorobenzene and the mixture is heated to boiling point. In the course of 125 minutes, it is possible to measure a drop in the isocyanate value from 34.6% at the start to 18.4% at the end of the heating period, with a simultaneous drop in the temperature from 175° to 165° C. with constant boiling of the mixture. After adding 0.44 part of benzyl chloride, a further drop in the isocyanate value at room temperature cannot be observed.

If, under otherwise the same conditions, the phenyl carbamic acid ester is replaced with equivalent amounts of other carbamic acid esters which were obtained from methyl alcohol and the isocyanates listed in the following table, the following residual content of isocyanate is produced within the polymerization period which is indicated:

| Carbamic acid methyl ester from— | Polymerisation time in minutes | Isocyanate, percent |
|---|---|---|
| 1,4-phenylene diisocyanate | 85 | 18.4 |
| Naphthalene-1,5-diisocyanate | 90 | 18.9 |
| p-Chlorophenyl isocyanate | 95 | 20.0 |
| Toluylene-2,4-diisocyanate | 105 | 18.7 |
| Toluylene-2,6-diisocyanate | 120 | 18.6 |
| Phenylene-1,3-diisocyanate | 140 | 18.6 |
| β-Phenyl ethyl isocyanate | 180 | 17.6 |
| Toluylene-2,5-diisocyanate | 205 | 18.6 |
| Hexamethylene diisocyanate | 215 | 20.4 |
| p-Nitrophenyl isocyanate | 220 | 19.6 |
| Cyclohexane-1,4-diisocyanate | 540 | 16.9 |
| Dicyclohexyl methane-4,4'-diisocyanate | 660 | 18.5 |

*Example 6*

3 parts of methyl alcohol and also 7.8 cc. of an N/1-solution of hexahydrodimethyl aniline in chlorobenzene are added to 714 parts of a 70% solution of hexamethylene diisocyanate. After a heating period of 220 minutes, during which the temperature of the mixture, kept constantly at boiling point, drops from 170° to 156° C., the NCO content of the solution has dropped from 34.3% to 17.1%. Polymerization is stopped by adding 11 cc. of an N/1-solution of phthalylchloride in chlorobenzene. After distilling off the chlorobenzene, there is obtained a yellowish golden, viscous polyisocyanate of relatively high molecular weight and having an NCO content of 24.3%.

*Example 7*

250 parts of hexamethylene diisocyanate in 89 parts of chlorobenzene are mixed with 1.5 parts of methyl alcohol and also with 24 cc. of an N/1-solution of N,N-diethylamino ethanol in chlorobenzene. After a heating period of 360 minutes, during which the temperature of the solution drops from 172° to 154° C. while constantly boiling, the isocyanate content has dropped from 33.4% to 13.4%. If 24 cc. of an N/1-solution of phthalyl chloride in chlorobenzene is now added, no further drop in isocyanate content is to be observed. After evaporating the chlorobenzene, a yellowish golden highly viscous polyisocyanate of relatively high molecular weight is obtained with an isocyanate content of 17.2%.

*Example 8*

250 parts of hexamethylene diisocyanate in 101 parts of chlorobenzene are mixed with 1.5 parts of methyl alcohol and also with 12 cc. of an N/1-solution of N-methyl diethanolamine in chlorobenzene. After a heating period of 360 minutes, during which the temperature of the mixture drops from 172° to 161° C. while boiling constantly, the isocyanate content has dropped from 33.4% to 19.2%.

*Example 9*

5.8 parts of butanol and also 0.5 cc. of a 10% solution of permethylated diethylene triamine in chlorobenzene are added to 250 parts of toluylene diisocyanate, which contains the isomers toluylene-2,4-diisocyanate, and toluylene-2,6-diisocyanate in the ratio 70:30 and dissolved in 107 parts of chlorobenzene. After heating for 1 hour to boiling point, no drop in the isocyanate content of 31.8% at the beginning is to be observed. After adding another 0.5 cc. of 100% permethylated diethylene triamine, the polymerisation is initiated. After another 88 minutes, an isocyanate value of 18.8% is measured, and at the same time there is to be observed a drop in temperature from 172° to 159° C., with constant boiling.

A polyisocyanate of relatively high molecular weight has been formed, and this polyisocyanate is obtained as a golden yellow hard resin after the solvent has been evaporated.

Instead of using butanol, it is also possible to employ the equivalent amount of n-octyl alcohol with the same result. On the other hand, if the operation is carried out without addition of an alcohol, 13 hours are necessary for achieving the same degree of polymerisation.

*Example 10*

90.5 parts of naphthalene-1,5-diisocyanate in 225 parts of chlorobenzene are mixed with 1.8 parts of phenyl carbamic acid methyl ester and with 0.75 cc. of a 10% solution of permethylated diethylene triamine and heated to boiling point. A drop in the isocyanate content from 11.4% is observed in the course of 90 minutes. A polyisocyanate of naphthalene-1,5-diisocyanate of relatively high molecular weight is formed.

*Example 11*

3.5 parts of 1,4-butylene glycol and also 1 cc. of a 10% solution of permethylated diethylene triamine in chlorobenzene are added to 357 parts of a 70% solution in chlorobenzene of toluylene diisocyanate with the isomer composition referred to Example 9 and the mixture is heated to boiling point. In the course of 135 minutes, a drop in the isocyanate content from 31.8% to 18.1% is to be recorded. A polyisocyanate of relatively high molecular weight is formed, this polyisocyanate having the properties described in Example 9.

*Example 12*

1176 parts of an 85% solution of hexamethylene diisocyanate in chlorobenzene are mixed with 6 parts of methyl alcohol in 2.4 parts of triethylamine and the mixture is heated to boiling point. Polymerisation is initiated after boiling for 25 minutes. In order to prevent the polymerisation from proceeding too violently, another 252 parts of chlorobenzene are added to the mixture. Under these conditions, polymerisation proceeds at moderate velocity and is stopped after another 55 minutes by cooling. The chlorobenzene is to be constantly kept at boiling point. After distilling off the chlorobenzene at 100° C. and at a vacuum of 15 mm. Hg, a polymer is formed which has an isocyanate content of 21.7% and a refractive index of $n_D^{20}=1.5032$. This polymer still contains fractions of monomeric hexamethylene diisocyanate, which can be removed by vacuum treatment at 150° C. and 0.05 mm. Hg. A yellow polyisocyanate is left which is tacky at room temperature, can be drawn out into filaments and is practically free from monomer, the said polyisocyanate having an isocyanate content of 16.25% and a refractive index of $n_D^{20}=1.5152$.

*Example 13*

174 parts of 1-methyl benzene-2,4-diisocyanate are mixed while stirring and passing over nitrogen in the course of half an hour at 150° C. with the solution of 47 parts of anhydrous phenol in 75 parts of chlorobenzene. In order to complete the reaction, the mixture is further heated for 2 hours at this temperature.

If 0.5 part of permethylated diethylene triamine is added, the temperature rises very quickly to above 200° C. After 13 minutes, a polymer has been formed which is practically insoluble in all solvents.

On the other hand, if the same amount of the diisocyanate in the diluted form indicated above is mixed with the same amount of tertiary amine, it is only possible to observe an increase in viscosity of the solution after heating for 6 hours. The isocyanate content has dropped in this period from 27.3% to 13.3%.

While certain representative embodiments and details have been shown for the purpose of illustrating this invention, it will be apparent to those skilled in the art that various changes and modifications may be made therein without departing from the spirit and scope of the invention.

What is claimed is:

1. A process for the production of polymers which comprises heating a mixture of an organic polyisocyanate having two to three —NCO groups per molecule with a tertiary amine in an amount of from about 0.0001% to about 2% by weight of tertiary nitrogen based on the weight of the —NCO groups in the mixture and from about 0.001 mol to about 0.3 mol per isocyanate group in said mixture of a carbamic acid ester, said organic polyisocyanate being essentially the sole polymer forming ingredient, until a polymer containing isocyanuric acid rings and containing at least three free —NCO groups is obtained.

2. The process of claim 1 wherein said organic polyisocyanate is an organic diisocyanate.

3. The process of claim 1 wherein said carbamic acid ester is formed by adding an organic monofunctional compound containing a single hydroxyl group to said organic polyisocyanate.

4. The process of claim 1 wherein said organic polyisocyanate is toluylene diisocyanate.

References Cited in the file of this patent

UNITED STATES PATENTS

| | | |
|---|---|---|
| 2,692,874 | Langerak | Oct. 26, 1954 |
| 2,838,511 | Kogon | June 10, 1958 |

OTHER REFERENCES

White: "The Journal of the Society of Dyers and Colourists," pages 481–486, vol. 70, No. 11, November 1954.

Monsanto Technical Bulletin No. P-125, 10 pages, Oct. 1, 1951, Monsanto Chemical Co., St. Louis 4, Mo.

Bailey et al.: "Industrial and Engineering Chemistry," pages 794–797, vol. 48, #4, April 1956.